Figure 1:
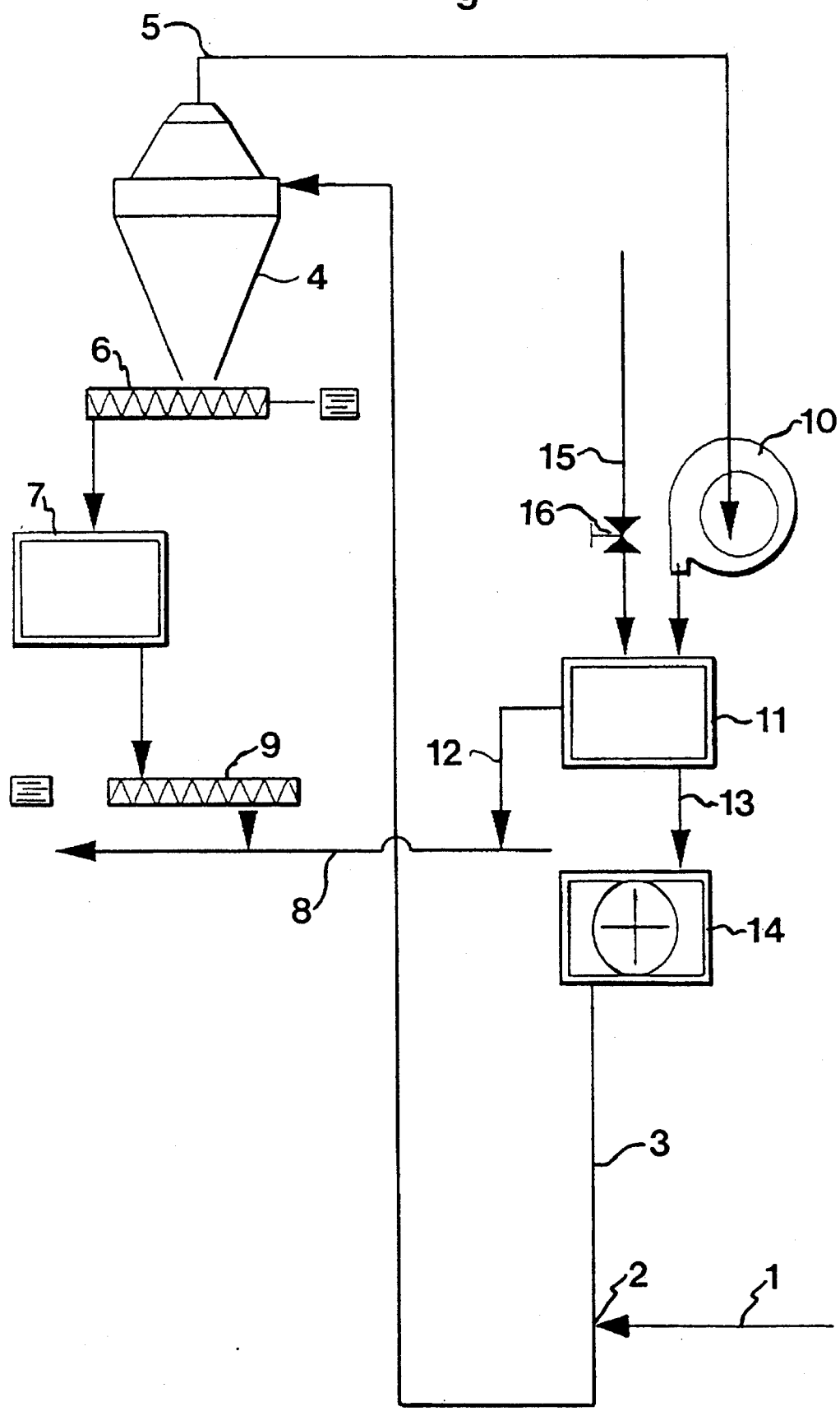

United States Patent [19]

Ralvert

[11] Patent Number: 5,492,567
[45] Date of Patent: Feb. 20, 1996

[54] METHOD AND APPARATUS FOR CONTINUOUS HEATING OF POWDERED STARCH

[75] Inventor: Klas Ralvert, Karlshamn, Sweden

[73] Assignee: Sveriges Stärkelseproducenter Förening UPA, Karlshamn, Sweden

[21] Appl. No.: 74,856

[22] PCT Filed: Sep. 1, 1991

[86] PCT No.: PCT/SE91/00573

§ 371 Date: Jun. 9, 1993

§ 102(e) Date: Jun. 9, 1993

[87] PCT Pub. No.: WO92/07007

PCT Pub. Date: Apr. 30, 1990

[30] Foreign Application Priority Data

Oct. 19, 1990 [SE] Sweden ................... 9003338

[51] Int. Cl.⁶ ................ C13D 1/12; C08B 30/00
[52] U.S. Cl. ................ 127/71; 127/5; 127/65
[58] Field of Search ................ 127/5, 67, 71

[56] References Cited

U.S. PATENT DOCUMENTS

| | | | |
|---|---|---|---|
| 2,098,293 | 11/1937 | Jefferies | 127/71 |
| 3,285,523 | 11/1966 | Duyckinck et al. | 241/53 |
| 4,141,316 | 2/1979 | Grun | 118/303 |
| 4,469,524 | 9/1984 | Assarsson et al. | 127/1 |
| 4,511,093 | 4/1985 | Ohkoshi et al. | 241/60 |
| 4,667,654 | 3/1987 | Thaler et al. | 127/65 |
| 4,911,930 | 3/1990 | Gergely et al. | 424/466 |
| 5,362,329 | 11/1994 | Yoshino et al. | 127/65 |

Primary Examiner—Paul Lieberman
Assistant Examiner—Patricia L. Hailey
Attorney, Agent, or Firm—Brooks & Kushman

[57] ABSTRACT

A method and an apparatus for continuous preheating of powdered starch in the preparation of modified starch are disclosed. The powdered starch (1) is fed into a preheating circuit including an inlet opening (2) for powdered starch in a conduit (3), and is pneumatically conveyed in the conduit by a hot air flow. When the powdered starch has been preheated by the air to the desired temperature, it is separated from the air in a separating device (4), whereupon the air is recycled in the circuit via a conduit (5), a fan (10) and a heat exchanger (14) for reheating the air, back to the inlet opening (2) for conveying and preheating of a fresh quantity of powdered starch. If necessary, excess air can be removed from, or supplementary air be supplied to, the preheating circuit.

6 Claims, 2 Drawing Sheets

METHOD AND APPARATUS FOR CONTINUOUS HEATING OF POWDERED STARCH

The present invention relates to a method and an apparatus for continuous heating of powdered starch. More specifically, the invention concerns a method and an apparatus for continuous preheating without simultaneous drying of powdered starch, used in the making of modified starch.

Starch is widely used as starting material in the making of modified starch by reaction with different reagents. Generally, powdered starch is first prepared from a raw material, such as cereal starch from maize, wheat, barley, rye, sorghum and rice, or root starch from potato, tapioca and arrowroot. The powdered starch is then modified by reaction with different reagents which may be gaseous, solid or, preferably, liquid. An example of starch modification is the making of cationic starch, used inter alia in the paper industry, by reacting powdered starch with a cationising reagent, e.g. 1-chlorine-2-hydroxypropyl trimethyl ammonium chloride.

To make the modification reaction proceed at a reasonable rate, the starch must have a temperature of about 30°–45° C., preferably about 35°–40° C. The starting material in the form of starch is, as a rule, kept in a silo where it is stored at ambient temperature, i.e. about 5°–30° C., and has a moisture content of about 19–21% by weight, preferably about 19.5–20.5% by weight. This means that the powdered starch normally has to be preheated before it is mixed with the modification reagent preparatory to the modification reaction. Preheating was formerly carried out with simultaneous drying of the powdered starch, since the modification reagent normally is a diluted aqueous solution. Drying was carried out in such a manner that the quantity of water dried up essentially corresponded to the quantity supplied with the reagent solution.

However, the introduction of new highly concentrated modification reagents has, on the whole, obviated the need for drying the powdered starch, and instead one wishes to preheat the powdered starch without any simultaneous drying. At the same time, rising energy prices and an increased environmental consciousness have led to demands for maximum utilisation of energy and elimination of discharges in the processes, i.e. that the processes be closed. Further, it is desirable that the process be continuous, contrary to prior-art batchwise processes.

The present invention aims at meeting these demands and providing a method and an apparatus for continuous heating of powdered starch, in which the starch is heated without drying, such that its moisture content is kept substantially constant.

The invention thus provides a method for continuous heating of powdered starch, which is characterised in that The powdered starch is fed through an inlet opening into a conduit where it is mixed with a hot air flow which heats the powdered starch and conveys it in the conduit, and that the powdered starch, when having reached the requisite temperature, is separated from the air, whereupon the separated air, after removal of any excess air, is reheated and recycled to the inlet opening of the conduit to form a substantially closed circuit.

The invention further provides an apparatus for continuous heating of powdered starch, which is characterised in that it comprises a substantially closed circuit which includes an inlet opening for powdered starch in a conduit for conveying powdered starch by means of a hot air flow; a device for separating the powdered starch from the air; a fan for feeding the air; optionally, a closable exhaust pipe for excess air; and a device for heating the air.

Further distinctive features and advantages of the invention appear from the following description and the appended claims.

According to the invention, the powdered starch is heated in a closed circuit with circulating hot air which heats the powdered starch to the desired temperature and at the same time pneumatically conveys the starch from its inlet in the circuit to its outlet.

In one embodiment of the invention, the powdered starch is fed into and out of the circuit substantially without any simultaneous feeding, in or out, of air, and the circuit thus is completely closed except for the feeding in and out of the powdered starch. The circuit only emits energy in the form of the heat that has been absorbed by the powdered starch. This heat is retained in the total system for starch modification and is utilised in the modification reaction. The heat absorbed by the powdered starch and thus emitted from the heating circuit is replaced by reheating of the air in the circuit by means of a heating device, such as a heat exchanger.

In another embodiment of the invention, the powdered starch is blown into the circuit by means of air, and the excess air supplied together with the powdered starch is removed in order to maintain a constant quantity of air in the circuit. The excess air is, however, not discharged to the surrounding atmosphere but to the system for starch modification, more precisely to a low-pressure conduit which by suction conveys powdered starch mixed with a modification reagent to a reactor for implementing the modification reaction. Thus, the energy content of the excess air is utilised, at the same time there is no discharge to the surroundings.

Figure 2:
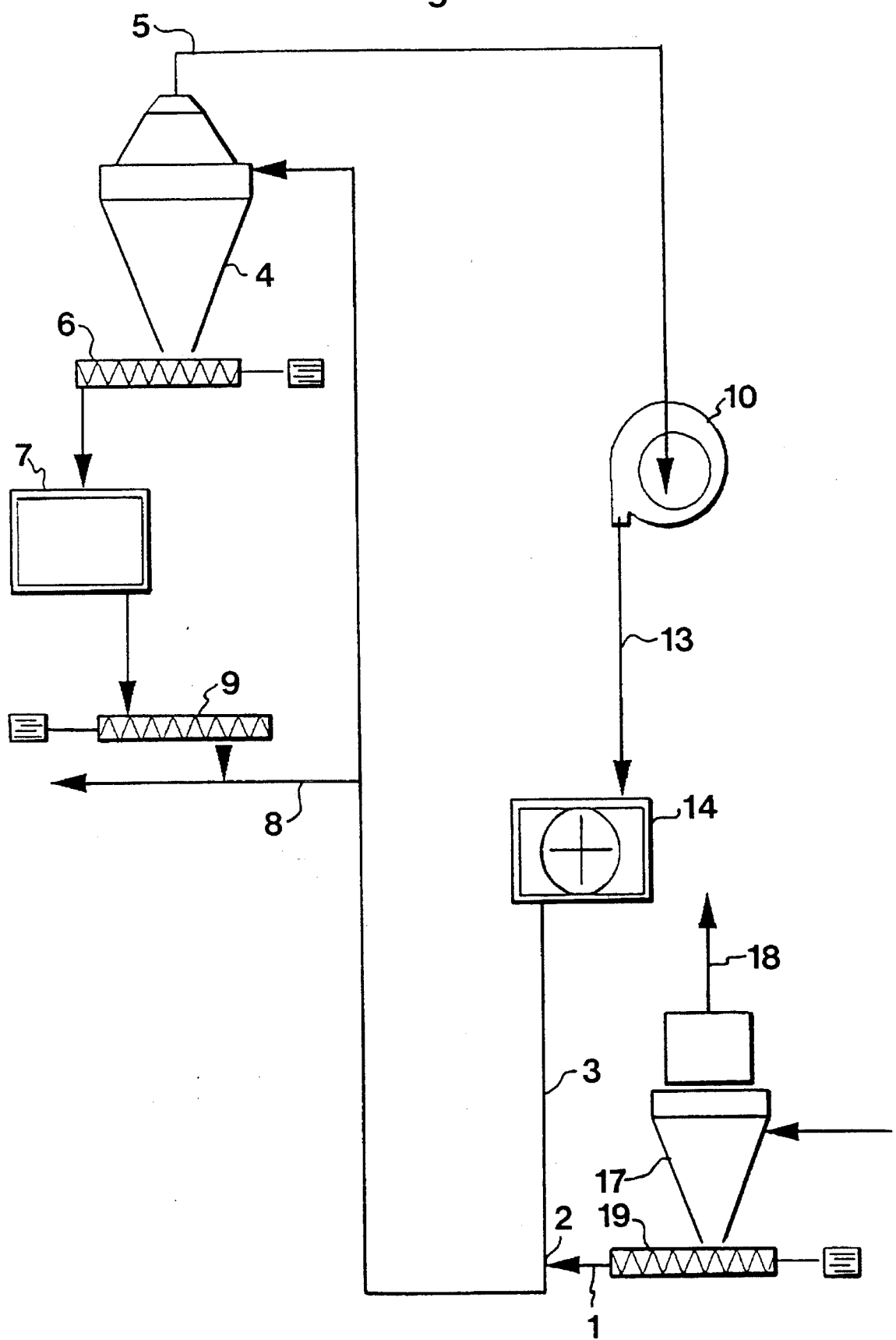

The invention will be described in more detail below, reference being had to the accompanying drawings, in which FIG. 1 illustrates a currently preferred apparatus for continuous preheating of powdered starch, and FIG. 2 illustrates a modified embodiment of the apparatus in FIG. 1.

As shown in FIG. 1, powdered starch 1 is fed from a silo (not shown) and introduced through an inlet opening 2 into a conduit 3. The feeding and introduction of the powdered starch are conveniently carried out in pneumatic manner by means of air, and the powdered starch is fed into the conduit together with the carrier air. The powdered starch from the silo has a temperature which roughly is equivalent to the ambient temperature and thus may vary, depending on the season and the weather, from one or two degrees above 0° C. to about 30° C., e.g. 5°–30° C. The powdered starch further has a moisture content of about 19–21% by weight, preferably about 19.5–20.5% by weight.

In the conduit 3, the powdered starch 1 encounters hot air with a temperature of about 55°–85° C., depending on the temperature of the powdered starch supplied and the desired final temperature thereof. The powdered starch 1 is pneumatically conveyed by the hot air in the conduit 3 and is heated simultaneously, and when the powdered starch has reached the desired temperature, it is separated from the then cooled air. The separation conveniently takes place in a cyclone 4, and the mixture of powdered starch and air is tangentially supplied at the circumference of the cyclone. The separated air departs upwards to a conduit 5, and the heated powdered starch is discharged from the lower part of the cyclone. The starch is discharged in convenient manner, e.g. by a rotary vane feeder or, as indicated in FIG. 1, by a screw feeder 6. The heated powdered starch thus discharged has a temperature of about 30°–45° C. preferably about 35°–40° C., and a substantially unaltered moisture content.

After having left the preheating circuit, the preheated powdered starch is fed from the screw feeder 6 to a preparator 7 where it is mixed with liquid and dry modification reagent. Then, the mixture of powdered starch and modification reagent is fed from the preparator 7 to a reactor (not shown) for realisation of the modification reaction. This feeding operationg is suitably carried out by suction in a low-pressure conduit 8, the mixture being conveniently transferred from the preparator 7 to the low-pressure conduit 8 by means of a rotary vane feeder or, as indicated in FIG. 1, a screw feeder 9.

The air separated from the powdered starch is recycled in the preheating circuit from the cyclone 4, via a conduit 5 and a fan 10, To a distribution box 11 where excess air is removed, via a conduit 12, to the low-pressure conduit 8. The quantity of excess air conveyed to the low-pressure conduit 8 is equivalent to the quantity of air fed into the preheating circuit together with the powdered starch through the inlet opening 2. Thus, the quantity of air in the preheating circuit is maintained essentially constant. From the distribution box 11, the air is fed, via a conduit 13, to a means for reheating the air to a temperature of about 55°–85° C. This heating means may be designed in any suitable known manner, for instance as a heat exchanger 14, as illustrated in FIG. 1. The hot side of the heat exchanger may, for instance, be supplied with hot water from a boiler (not shown). From the heat exchanger 14, the reheated air is fed to the inlet opening 2 for conveying and heating a fresh quantity of powdered starch.

FIG. 1 further shows a conduit 15 which is equipped with a shut-off valve 16 and ends in the distribution box 11. This conduit is optional, and is intended to be used for the supply, if any, of supplementary air to the preheating circuit. Normally, there is no need of any such supply, since the quantity of air in the preheating circuit is adjusted by removing excess air through the conduit 12. It will be appreciated that the optional conduit 15 need not end in the distribution box 11, but may end elsewhere between the cyclone 4 and the heat exchanger 14.

FIG. 2 illustrates an alternative embodiment of the apparatus shown in FIG. 1. The apparatus in FIG. 2 differs from the one in FIG. 1 primarily in that the powdered starch 1, before it is fed into the conduit 3, is separated from accompanying air in a cyclone 17. The thus-separated air departs at 18, while the powdered starch is fed through the inlet opening 2 by a screw conveyor 19. Since no air is fed into the preheating circuit together with the powdered starch, there is no need for excess air removal, and FIG. 2 consequently does not include a distribution box with associated exhaust pipe to the low-pressure conduit 8. In practice, however, the circuit may comprise such equipment, in which case the conduit 12 is maintained shut by a valve (not shown). Like the apparatus in FIG. 1, the apparatus in FIG. 2 may also be equipped with a conduit 15 for supplementary air, but, as indicated above, there is normally no need for this.

Otherwise, the apparatus in FIG. 2 corresponds to that in FIG. 1, and like elements have like reference numbers in both Figures. Since also the function of the apparatus in FIG. 2 is identical to that of the apparatus in FIG. 1, it will not be described in more detail here but reference is instead made to the description which bears upon FIG. 1.

The dimensions of the preheating circuit according to the invention are suitably adapted to the total starch-modification plant, i.e. to the amount of starch modified in the reactor per unit of time. In an existing plant, it has been found suitable to feed in about 4–6 ton powdered starch/h, either together with about 600 m³ air/h (the embodiment of FIG. 1) or without air (the embodiment of FIG. 2). The fan 10 then is dimensioned to feed about 5500 m³ air/h in the circuit, and the velocity of the air flow in the circuit is about 8–15 m/s, normally about 10–14 m/s. Further, the conduit 3 is conveniently dimensioned so as to have a slightly larger cross-section than the return conduit 5; the conduit 3 may, for instance, have an inner diameter of about 400 mm, while the conduit has an inner diameter of about 300 mm.

The invention will be further illustrated below by two non-restricting Examples.

EXAMPLE 1

Powdered potato starch with a moisture content of about 20% by weight and a temperature of about 10° C. was stored in a silo. The starch was used for making modified cationic starch. Before being reacted with a cationising reagent, the starch was preheated to a desired predetermined temperature of about 35° C., in accordance with the invention, as follows.

Thus, 6 ton powdered starch per h was pneumatically fed from the silo by means of an air current and supplied through the inlet opening of a preheating circuit of the type described above in relation to FIG. 1. The circuit included a conduit which had a diameter of about 400 mm and in which air that had been preheated to a temperature of about 75° C. and had a moisture content of about 20% by weight flowed at a speed of about 12 m/s. The powdered starch fed through the inlet opening by the air was conveyed by the heated air in the conduit and was heated simultaneously. When having reached a temperature of about 35° C. and a moisture content of about 20% by weight, which was achieved after a distance of about 20 m, the powdered starch was separated from the cooled carrier air in a cyclone. The powdered starch was withdrawn from the lower part of the cyclone and fed by a screw feeder to a preparator in which the powdered starch was mixed with a cationising reagent in the form of an 80% aqueous solution of 1-chlorine-2-hydroxypropyl trimethyl ammonium chloride. After admixture of the cationising reagent, the mixture was drawn through a low-pressure conduit to a reaction tower where the cationisation reaction was carried out.

The cooled air separated from the powdered starch in the cyclone was then led in the preheating circuit through a return conduit with a diameter of about 300 mm, to the suction side of a fan which circulated about 5500 m³/h in the circuit. After the fan, excess air was removed from the circuit (about 600 m³/h) via an exhaust pipe to the low-pressure conduit which fed the mixture of powdered starch and cationising reagent from the preparator to the reaction tower. The quantity of air thus removed was equivalent to the quantity of air supplied to the circuit when the powdered starch was pneumatically fed into the circuit.

After removal of excess air, the air was fed in the preheating circuit to a heat exchanger where it was reheated to about 75° C. To heat the air, the heat exchanger was supplied with hot water with a temperature of about 85° C. from a boiler. After being reheated in the heat exchanger, the air was fed to the inlet opening of the circuit for conveying and preheating more powdered starch.

As is apparent from the foregoing, the preheating circuit was essentially closed and, apart from the feeding in and out of starch, only excess air was removed from the circuit to the surroundings, i.e. to the low-pressure conduit. This removal was, however, comparatively insignificant, and the heat content of the removed air was utilised in the total system. Since the circuit is substantially closed, the moisture content in the system is maintained at an essentially constant level corresponding to the moisture content of the powdered starch, and the powdered starch may thus be heated to the desired temperature without any drying effect, i.e. without any reduction of the moisture content.

EXAMPLE 2

It was proceeded as in Example 1, but, instead of pneumatically blowing powdered starch from the silo through the inlet opening into the circuit, the powdered starch was fed through the inlet opening by a screw feeder after having been separated in a cyclone from the air used for conveying the powdered starch from the silo. Thus, the powdered starch was fed into the circuit without any simultaneous air supply, which obviated the need for excess air removal to the suction conduit. In this Example, the preheating of the powdered starch was carried out in the manner described with reference to FIG. 2. The temperatures and flows corresponded to those of Example 1.

I claim:

1. Method for continuous heating of powdered starch without drying it, characterised by the steps of:

feeding the powdered starch through an inlet opening into a conduit and mixing the powdered starch with hot air as the sole treating agent, thus heating the powdered starch and conveying it in the conduit, and when the powdered starch reaches a temperature of about 30°–45° C., separating the heated powdered starch from the air, said heated powered starch having a substantially unaltered moisture content, whereupon, after removal of any excess air, reheating and recycling the separated air to the inlet opening of the conduit to form a substantially closed circuit.

2. The method of claim 1, characterised in that the powdered starch is blown through the inlet opening into the conduit by means of air.

3. The method of claim 1, characterised in that after air is separated from the powdered starch, the powdered starch then is fed into the conduit by a feeding screw.

4. The method of claim 1 or claim 2, characterised in that excess air is removed from the conduit and fed to a suction pipe of a system for starch modification for conveying a mixture of powdered starch and a modification reagent to a reactor.

5. The method of any one of the preceding claims, characterised in that the hot air flow has a temperature of about 55°–85° C. at the inlet opening.

6. The method of claim 1 or claim 2 or claim 3, characterized in that the powdered starch is heated to a temperature of about 35°–40° C.

* * * * *

UNITED STATES PATENT AND TRADEMARK OFFICE
CERTIFICATE OF CORRECTION

PATENT NO.  : 5,492,567
DATED       : February 20, 1996
INVENTOR(S) : Klas Ralvert It is certified that error appears in the above-identified patent and that said Letters Patent is hereby corrected as shown below:

Title page, item [22], delete "Sep. 1, 1991" and insert
    --SEP. 3, 1991--.

Signed and Sealed this

Twelfth Day of November, 1996

Attest:

BRUCE LEHMAN

Attesting Officer        Commissioner of Patents and Trademarks